United States Patent Office 3,210,381
Patented Oct. 5, 1965

3,210,381
PROCESS FOR THE LIQUID PHASE DIRECT OXIDATION OF OLEFINS TO OLEFIN OXIDES
Virgil W. Gash, Ballwin, Mo., assignor to Monsanto Company, a corporation of Delaware
No Drawing. Filed Aug. 15, 1962, Ser. No. 216,967
9 Claims. (Cl. 260—348.5)

This invention is directed to a new and improved process for the preparation of olefin oxides. It is further directed to an improved solvent for use as an oxidation medium for the preparation of olefin oxides by the action of molecular oxygen upon olefins.

Still more particularly this invention relates to a process for the direct epoxidation of olefins with molecular oxygen in a solvent comprising certain boric acid esters.

Olefin oxides are extremely useful articles of commerce. They are used as starting materials for the preparation of anti-freeze compositions, humectants, pharmaceutical preparations, cosmetic formulations, as monomers for the preparation of polymers useful in preparing polyurethanes, and the like. Notable among these epoxides are ethylene oxide and propylene oxide. Currently these are prepared by a vapor phase catalytic method and by the classic two-step chlorohydrin route, respectively. The vapor phase process insofar as industrial production of epoxides is concerned, is confined to the preparation of ethylene oxide. Higher olefins have yet to be used in a vapor phase catalytic process to give economic production of the corresponding oxides. The older chlorohydrin route is the principal industrial process which supplies the largest quantities of propylene oxide for commerce. This process is suitable for conversion of ethylene and propylene to their corresponding epoxides, but higher olefins are not particularly adaptable to the chlorohydrin route.

Still a third process for preparation of olefin oxides is that involving peracetic acid oxidation of olefins to the corresponding oxides. This process appears to have wider application insofar as olefin structure is concerned than do the first two methods mentioned. It apparently proceeds by an ionic mechanism, and the rate of epoxidation using peracetic acid is characteristic of the structure of the olefin. For example, highly substituted ethylenes, for example, tetramethylethylene and trimethylethylene react smoothly and rapidly with peracetic acid to give the corresponding epoxides. However, ethylenic compounds having much lower degrees of substitution about the ethylene group, for example, ethylene and propylene, by virtue of the ionic nature of the reaction, react sluggishly with peracetic acid and the rate of formation of the corresponding epoxides is very slow.

Nevertheless, each of these aforementioned processes has inherent disadvantages. For example, vapor phase catalytic oxidation of ethylene to ethylene oxide requires large volume equipment and the handling of tremendous quantities of potentially explosive mixtures of ethylene and oxygen. The second process, that is, the chlorohydrin route, for propylene oxide essentially involves a two-step process; in addition, chlorinated by-products arise in this process. The third process, involving peracetic acid oxidation of olefins, is potentially hazardous if relatively large quantities of peracetic acid are to be used. It is noted, however, that the peracetic acid process is probably the most versatile of the three methods; it is applicable to a far greater range of olefin structures than is the vapor phase catalytic process or the chlorohydrin process.

There are scattered references to still a fourth method of preparing olefin oxides, namely the liquid phase oxidation of olefins with molecular oxygen. Several of these are restrictive in the sense that specific limitations are incorporated in each method. For example, catalysts or other additives or secondary treatment of the oxidation mixtures with basic materials are essential features of these methods.

Since the present invention is concerned with a novel liquid phase epoxidation system, the discussion below will be directed to typical existing prior art schemes for liquid phase olefin oxidations. These prior art processes describe a variety of approaches to a proper balance of a series of reaction variables in order to obtain the desired olefin oxide. For example, various specific oxidation catalysts or catalyst solvent systems have been described (U.S. Patents 2,741,623, 2,837,424, 2,974,161, and 2,985,668); another approach is the incorporation of oxidation anticatalysts which retard certain undesirable side reactions (U.S. Patent 2,279,470); still another approach emphasizes the use of water-immiscible hydrocarbon solvents alone, or in the presence of polymerization inhibitors such as nitrobenzene (U.S. Patent 2,780,635); or saturated hydrocarbons (U.S. Patent 2,780,634); another method describes the use of neutralizers such as alkali metal and alkaline earth metal hydroxides, or salts of these metals (U.S. Patent 2,838,524); another approach involves the use of certain catalysts in an alkaline phase (U.S. Patent 2,366,724), or a liquid phase maintained at specified critical pH values (U.S. Patent 2,650,927); and still other approaches emphasize criticality of oxygen pressure (U.S. Patent 2,879,276), or the geometry of the reaction zone (U.S. Patents 2,530,509 and 2,977,374). The foregoing represent prior art approaches to problems encountered in the utilization of a liquid phase oxidation process to obtain olefin oxides.

It is the primary object of the instant invention to provide a superior process for commercial production of olefin oxides which process is free of numerous limitations recited in prior art processes.

A further object of this invention is to provide a liquid phase process for the production of olefin oxides which is not dependent upon the presence or absence of any catalyst; nor dependent upon the presence of water-immiscible solvents or upon solvents containing added buffers or acid neutralizers or other additives or secondary treatments with alkaline materials to remove acidic components; nor is it dependent upon the presence of saturated compounds, initiators or anti-catalysts; further it is not dependent upon critical reactor geometries, temperatures, pressures, pH level, oxygen concentration, flow rates, or reactant ratios.

It is a further object of this invention to provide a new class of solvents for direct expoxidation of olefins with molecular oxygen.

It is an additional object of this invention to provide a new process which is applicable to a wide range of olefin structures; that is, it is not limited to a single olefin or two, but rather, has a broad application over a large class of unsaturated compounds.

It is an additional object of this invention to provide a new process which requires relatively small scale equipment and does not involve the hazards associated with certain of the prior art process, e.g., the vapor phase process.

Other objects of this invention are to provide a process for production of olefin oxide in batch or continuous manner by a method which is simple, safe, economical and dependable.

These and other objects of the invention will become apparent to those skilled in the art as description of the invention herein proceeds.

According to the present invention, it has been discovered that olefins can be oxidized to epoxides with molecular oxygen in high conversions and yields when the oxidation is allowed to proceed in a liquid reaction medium comprising boric acid esters having the following general formula:

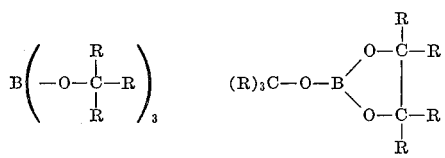

and

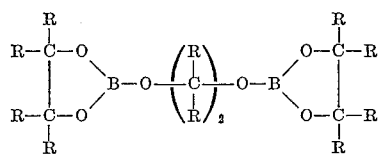

and mixtures thereof, wherein R represents hydrogen, straight chain alkyl groups having from 1 to 3 carbon atoms or straight chain akyl and haloalkyl groups having from 1 to 3 carbon atoms having as substitutes on other than the terminal carbon atom thereof one or more alkyl or haloalkyl groups having from 1 to 3 carbon atoms. An essential limitation upon the selection of boric acid esters for use herein is that the carbon atoms to which the R groups are attached in the above formulae have not more than one methylene ($-CH_2-$) group attached thereto. The borates can have all R's dentical or the borate may have mixed groups present, e.g., where all R's in a given ester are hydrogen or akyl or haloalkyl according to the above definition, or the R's can be mixtures of these groups.

It is a characteristic feature of the specific group of boric acid esters disclosed herein that no labile hydrogen atoms be present on the carbon atoms attached to the oxy oxygen ($-O-$) atoms and that not more than one methylene group be attached to said carbon atoms. It is a feature of the instant solvents that the bonds between the carbon atoms (of the alcohol moiety) and the hydrogen atoms attached thereto are protected against cleavage by a screening effect or steric hindrance afforded by the presence of stable groups attached to or proximate to said carbon atoms and also, in the case of the cyclic borates, by the borate

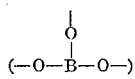

moiety. Preferably, the stable groups attached to said carbon atoms are methyl or branched chain groups having no labile hydrogen atoms and are attached to at least two of the three available valence bonds of the carbon adjacent to the oxy oxygen in the acyclic borates (the fourth set of valence electrons being bonded to said oxygen), or at least one of the two available valence bonds in cyclic borates. However, it is not essential that these stable groups be directly attached to said carbon atom In an operable embodiment, a boric acid ester according to the above general formula can have a four-carbon straight alkyl group with up to three methylene groups in any R. In another embodiment, the isopropyl radical can be attached to the oxy oxygen atom. In both of these embodiments, hydrogen atoms are attached to the carbon atom adjacent to the oxy oxygen, but because of the proximity of stable methyl groups the hydrogen atoms are stabilized against abstraction by oxygen atoms.

Typical acyclic borate esters suitable herein include trimethyl borate, tritertiarybutyl borate methyl bis(dimethyltrichloroethyl) borate, dimethyl 1,1-dimethylbutyl borate, methyl bis(1,1,3-trimethyl-3-bromobutyl) borate, dimethyl tertiarybutyl borate, ethyl dimethyl borate, triethyl borate, isopropyl dimethyl borate, n-butyl dimethyl borate, and the like.

Of the acyclic boric acid ester solvents disclosed herein the most preferred member is trimethyl borate because of its ease of preparation and ready availability.

Typical cyclic borate esters suitable herein include methyl ethylene borate, t-butyl ethylene borate, methyl propylene borate, t-butyl propylene borate, 2,2,2-trichloroethyl ethylene borate, 1,1,3-trimethyl-3-bromo-butyl propylene borate, methyl dimethylethylene borate and the like. Other cyclic borate esters include bis(1,3,2-dioxaborolanyloxy)ethane, bis(4-methyl-1,3,2-dioxaborolanyloxy)-1,2-propane, bis(4,5-dimethyl-1,3,2-dioxaborolanyloxy)-2,3-butane, bis(4-trichloromethyl - 1,3,2 - dioxaborolanyloxy)-3,3,3-trichloro-1,2-propane, and bis(4-isopropyl-1,3,2-dioxaborolanyloxy)-1-isopropyl - 1,2-ethane.

These esters are readily prepared by means known to the art such as by reacting boric acid with the diol corresponding to the desired ester, or by reaction of boron trichloride or boric anhydride with the desired alcohol or glycol.

The solvents contemplated herein may be used individually or as admixtures. For example, trimethyl borate and methyl ethylene borate mixed in varying proportions constitute a suitable reaction medium according to the present invention. In like manner, acyclic borates mixed with other acyclic borates and mixtures of cyclic borates are suitably employed herein.

The solvents contemplated herein combine essential characteristics and features required for successful liquid phase oxidation, that is, they are essentially chemically indifferent and are oxidatively and thermally stable. Furthermore, the instant solvents are superior to those disclosed in prior art liquid phase olefin oxidation processes in that they do not require buffers, neutralizers, initiators, inhibitors and/or catalysts in order to utilize the above-mentioned essentials to effect oxidation of the olefin to the olefin oxide in high yield and conversion. The solvents of prior art processes require buffers, neutralizers, initiators, inhibitors and/or catalysts in order to promote the oxidation of the olefin and combat the deleterious effects of by-products such as acidic components.

It is known that olefin oxidations give, in addition to epoxides, various by-products such as water, formic acid and acetic acid which can be deleterious to the oxidation when present in appreciable quantities by reacting with the olefin oxide to give corresponding glycol and glycol derivatives as well as undesired polymeric materials. Prior art methods have used a variety of approaches to counteract these deleterious effects, such as the use of water-immiscible hydrocarbon solvents containing inhibitors or utilized in conjunction with a separate washing step with solutions of basic substances, in effect, processes which require acid removal in order for such water-immiscible hydrocarbon solvents to be used for the olefin oxidation.

Probably the most deleterious constituent is formic acid which by virtue of its strong acidity (stronger than acetic acid by a factor of 10) reacts with the desired olefin oxide to form undesirable by-products. It has been found that acetic acid, unlike formic acid, can be tolerated in the reaction mixture in much greater amounts than formic acid without producing any adverse effects. One way to remove the reactive formic acid from the reaction mixture is by salt formation, that is, by addition of an organic or inorganic base. However, these basic compounds are known to inhibit the primary oxidation reaction and therefore cannot suitably be used. The formation of salts likewise presents additional mechanical problems due to a build-up thereof in the reactor necessitating resort to salt removal systems.

A feature of the present invention is the scavenging of the deleterious formic acid as it is produced in the reaction through the use of an ester of the class described herein, such as methyl ethylene borate. An advantage of using these esters as an acid scavenger is that a stable neutral material, i.e., the ester is used to remove the strong formic acid by ester interchange and at the same time yield relatively innocuous products.

In order to use the presently-described esters as an oxidation solvent, the acid and alcohol moieties that make up the ester must have inherent oxidative and thermal stability or these properties must arise as the result of ester formation between the two moieties. The oxidative stability herein referred to has reference to the stability of these compounds toward air or molecular oxygen. In making reference to the oxidative stability of a particular compound it is necessary to make reference to the oxidizing agent, that is, the oxidants used in the reaction. For some compounds stable to chromic acid or potassium permanganate are not stable to other oxidizing agents. For example, alkaline hydrogen peroxide is a specific oxidant for epoxidation of conjugated double bonds. Yet, the instant esters are not a suitable medium for the use of alkaline hydrogen peroxide in epoxidation of such double bonds because the esters react with the alkali to form a metal salt without production of epoxide.

Oxidation substrate also behaves differently with respect to the oxidant being used. For example, the acid-catalyzed reaction of peracetic acid or perbenzoic acid with cyclohexene will yield the epoxide. However, the reaction of nitric acid or permanganate on the same substrate will yield different products, e.g., using photooxidation with light in the presence of a catalyst the methylene group adjacent to the double bond is attacked to give a hydroperoxide and the double bond is not attacked. Hydrogen peroxide whether acidic or basic or as the rarely used neutral compound is known not to attack methylene groups. On the other hand, these groups are susceptible to attack not only by molecular oxygen, but also by nitric acid, chromic acid, permanganates and many other stronger oxidants. It is for these reasons that the esters used in the present invention must be those which do not contain more than one methylene group, or labile hydrogen atoms on the carbon atom adjacent to the oxy oxygen, i.e., the carbon atom of the alcohol moiety.

It is a primary feature of the present invention that the boric acid ester solvents used herein need no added substances to counteract the deleterious effect of water and acids. Furthermore, the solvents used herein for the olefin oxidation have appreciable co-solubility with water, hence, avoid the problems engendered with a two phase reaction system arising from the use of water-immiscible solvents. Moreover, by use of the instant solvents a surprisingly substantial quantity of water and organic acids can be tolerated without undue adverse effects upon the course of the olefin epoxidation.

It is a further feature of the instant invention that the olefin oxidations proceed at such a rapid rate that the oxygen is quantitatively consumed, hence, accumulation of potentially hazardous explosive mixtures of oxygen and organic materials in the vapor state are avoided.

It is further apparent that there is no criticality insofar as pH value is concerned for this oxidation since appreciable concentrations of acid by-products, for example, up to 20 weight percent of acetic acid is not particularly deleterious. Hence, the olefin oxidation in the present solvents proceeds suitably over a range of pH's as low as pH 4 and in neutral and alkaline pH ranges.

Substantial evidence exists that these olefin oxidations, for example, propylene to propylene oxide, by direct oxidation with molecular oxygen are propagated by a free radical chain mechanism. Copper and its compounds are strong inhibitors for this propylene oxidation; an inhibition probably due to a redox reaction of copper with peroxy radicals which interrupts the chain propagation sequence and prevents attainment of a long kinetic chain necessary for reasonably conversion of the olefin. In addition, when free radical inhibitors, that is, antioxidants are added to the reaction mixture, partial or complete inhibition of the olefin oxidation occurs. In the absence of such inhibitors a very rapid, vigorous exothermic oxidation of the olefin occurs in the solvent. Furthermore, the present solvents are apparently very resistant to free radical attack and are recovered substantially unchanged. On the contrary, among prior art solvents benzene is an example of a compound which is readily attacked by free radicals. Such a benzene radical can react with oxygen to give phenolic or quinonoid-type molecules which are known to be efficient inhibitors for radical chain oxidations. Thus, when benzene is used as a solvent for an olefin oxidation its susceptibility to free radical attack gives rise to an effect which might be called autoinhibition, that is, the rate of oxidation of the olefin decreases with time. In comparison, the boric acid ester solvents described herein have a high order of resistance to radical attack and do not impede the radical chain sequence and the rate of oxidation of the olefin is not affected; the olefin oxidation proceeds to the depletion of either the olefin or the oxygen.

The boric acid ester solvents used in the instant invention constitute a suitable reaction medium for substantially all olefin oxidations with molecular oxygen to form olefin oxides. The term "molecular oxygen" as used herein includes pure or impure oxygen as well as gases containing free oxygen, for example, air.

Olefins suitable for use herein preferably include those of the acyclic and cyclic olefinic series up to 18 carbon atoms per molecule, e.g., ethylene, propylene, butenes, pentenes, hexenes, heptenes, octenes nonenes, dodecenes, pentadecenes, heptadecenes, octadecenes, cyclobutenes, cyclopentenes, cyclohexenes, cyclooctenes, etc. Of particular interest, utility and convenience are the olefins containing from 2 to 8 carbon atoms. Included are the alkyl-substituted olefins such as 2-methyl-1-butene, 2-methyl-2-butene, 2-methyl-propene, 4-methyl-2-pentene, 2-ethyl-3-methyl-1-butene, 2,3-dimethyl-2-butene and 2-methyl-2-pentene. Other suitable olefinic compounds include hydrogenated phthalic anhydrides, such as dihydro- and tetrahydrophthalic anhydrides. Other olefins include butadiene, isoprene, other pentadienes, hexadienes, heptadienes, octadienes, decadienes, octadecadienes, alkyl and polyalkyl-substituted cycloalkenes and cycloalkadienes, vinyl-substituted cycloalkenes and benzenes, cyclopentadiene, dicyclopentadiene, styrene, methylstyrene, alkylmethylstyrene, and other vinyl substituted aromatic systems. Another class of olefinically unsaturated compounds which are of interest in this direct epoxidation to epoxides are the unsaturated macromolecules, that is, the rubbers, such as butadiene polymers, isoprene polymers, butadiene-styrene copolymers, isobutylene-isoprene copolymers, chloroprene polymers and other copolymers incorporating dienic and vinyl comonomers therein, and the like.

Particularly suitable olefin feed stocks contemplated in the instant invention include the pure olefin or mixtures thereof or olefin stocks containing as much as 50% of saturated compounds. Olefinic feed materials include those formed by cracking petroleum stock such as hydrocarbon oils, paraffin wax, lubricating oil stocks, gas oils, kerosenes, napthas and the like.

The reaction temperature used in liquid phase olefin oxidations using the solvents of the instant invention are subject only to a lower limit below which the oxidation either proceeds too slowly or follows a course other than that leading to olefin oxides. The upper limit of the temperature range is that which may be termed a threshold above which substantial decomposition, polymerization or excessive oxidative side reactions occur, thereby leading to undesirable side reactions and products which substantially detract from the yield of the olefin oxide. In general, temperatures of the order of 80° C. to 350° C. are contemplated. It is expedient to maintain temperatures at a sufficiently high level to insure thermal decomposition of hazardous peroxides which may be formed and accumulated to the point of unsafe operation. Within this general temperature range preferred temperatures are within the range of 130° to 250° C.

Subatmospheric, atmospheric or superatmospheric pressures are suitable for use in the instant invention, that is, ranging from 0.5 to 350 atmospheres. Usually the oxidation reaction is facilitated by the use of higher pressures, hence a preferred pressure range is from 6 to 150 atmospheres. Pressures herein delineated and temperatures described previously will generally be selected, of course, depending upon the characteristics of the individual olefin which is to be oxidized to the olefin oxide, but this combination of temperatures and pressures will be such as to maintain a liquid phase. Olefin oxidations in the instant solvents are autocatalytic, that is, they are free radical chain reaction mechanisms, and the reactions proceed very rapidly after a brief induction period and give remarkably constant product composition over wide variations of conditions. A typical olefin oxidation, for example, propylene in batch operation, requires from about 1 to 20 minutes. Similar, or faster, reaction rates occur in continuous operation. The reaction vessel for conducting this olefin oxidation can be made of materials which may include almost any kind of ceramic material, porcelain, glass, silica, various metals, such as stainless steels, aluminum, silver and nickel, which vessels do not necessarily have to conform to any particular geometric design. It should be noted in the instant invention that no added catalysts are necessary and no reliance is placed upon catalytic activity of the walls of the reactor or reactor components.

Various means known to the art can be utilized for establishing intimate contact to the reactants, i.e., olefin and molecular oxygen in the solvent, for example, by stirring, sparging, shaking, vibration, spraying or other various agitation in the reaction mixture. The vigorous agitation of the reaction mixture effects not only intimate contact of olefin and oxygen, but also facilitates removal of the heat of reaction to suitably oriented heat exchangers. It is to be noted, also, that the exothermic nature of the olefin oxidation is such that very small or negligible amounts of heat need be applied to the reaction system in order to maintain the desired temperature of operation, hence, reaction temperature is adequately maintained by suitable design and proper use of heat exchange components.

As noted above, no added catalysts are required in the present invention. The usual oxidation catalysts can be tolerated although usually no significant benefit accrues from their use because the olefin oxidations proceed in such facile manner in the solvents of the instant invention. Oxidation catalysts such as platinum, selenium, vanadium, manganese, silver, cobalt, cadmium and mercury in metallic or compound form, preferably as oxide or carbonate or as soluble acetates or carboxylates may be present singly or mixed in gross form supported or unsupported or ash finely-divided suspensions or in solutions in the solvent.

It should also be noted that since olefin oxidations according to this invention proceed at such a rapid rate after a brief induction period no initiators, accelerators, of promoters are required, but these may be used to shorten or eliminate the brief induction period after which no additional initiator, promoter or accelerator need be added. Suitable initiators, accelerators or promoters include organic peroxides such as benzoyl peroxide, tertiarybutylhydroperoxide, ditertiarybutyl peroxide; inorganic peroxides such as hydrogen and sodium peroxides; organic peracids such as peracetic and perbenzoic acid or various other peroxidic derivatives such as the hydroperoxide addition products of ketones and aldehydes. Also useful as initiators, promoters, or accelerators for the purpose of reducing the time of the induction period, but following which induction period no more need be added are readily oxidizable materials such as aldehydes, e.g., acetaldehyde, propionaldehyde, isobutyraldehyde and the like and ethers such as diethyl ether, diisopropyl ether.

The reaction mixtures to be used in carrying out the process of the instant invention may be made up in a variety of ways. Exemplary combinations are the olefin and/or oxygen premixed with the solvent, the olefin premixed with the solvent, suitably up to 50% by weight and, preferably, from 10% to 45% by weight of the solvent, and the oxygen added thereto. The solvent to olefin molar ratio will vary from 1 to 10. The oxygen-containing gas may be introduced into the olefin-solvent mixture incrementally or continuously. Or, the reactor may be charged with solvent and the olefin and oxygen gas may be introduced simultaneously through separate feed lines into the body of the solvent in a suitable reaction vessel. In one embodiment the olefin and oxygen-containing gas mixture is introduced into the solvent in a continuously stirred reactor, under the conditions of temperatures and pressures selected for this particular olefin. Feed rates, generally, of oxygen or oxygen-containing gas may vary from 0.5 to 1500 cubic feet per hour or higher and will largely depend upon reactor size within production quantity desired. The oxygen input is adjusted in such manner as to allow virtually complete usage of oxygen, thereby keeping the oxygen concentration in the off-gas above the reaction mixture below about 1%. Obviously this safeguard is necessary in order to prevent a hazardous concentration of explosive gases, as is well known in the art. Proper adjustment of feed rates is of importance in order that the olefin not be stripped from the liquid phase, thus reducing its concentration, hence reducing the rate of oxidation of the olefin which would result in lower conversions per unit time of olefin to olefin oxide. The solvents used herein represent the predominant constituent in the reaction mixture, with respect to all other constituents, including reactants, oxidation products and by-products. By predominant is meant enough solvent is always present to exceed the combined weight of all other constituents. In other words, the reaction mixture comprises major amounts of the solvent and minor amounts of all other constituents with respect thereto.

The oxidation products are removed from the reactor as a combined liquid and gaseous effluent containing the olefin oxide, unreacted components and by-products, by properly adjusting conditions of temperature and pressure and by adjustment of a let-down system, or the entire reaction mixture containing the oxidation products is removed from the reactor; conventional techniques for separation of desired product including distillation, fractionation, extraction, crystallizations and the like, are employed to effect separation of the desired olefin oxide. One procedure comprises continually removing the liquid effluent from the reaction zone to a distillation column and removing various fractions of products contained therein, in effect, a fractionation to obtain the olefin oxide. From such suitable fractionation process the solvent is recovered and is recycled to the reaction zone.

The invention will be more fully understood by reference to the illustrative specific embodiments presented below.

A modified cylindrical Hoke high pressure vessel is employed for the batch-type oxidations described below. A high pressure fitting was welded to the vessel near one end to serve as gas inlet, and a block valve with rupture disc was attached to this fitting with a one-quarter inch high pressure tubing "goose-neck." A thermocouple was sealed into one end opening of the vessel. The solvent and initiator (if any employed) are then charged through the other end opening which is then sealed with the plug. The olefin is then charged to the desired amount, as determined by weight difference, that is, the olefin, if normally gaseous, is charged under pressure, and if normally liquid, may be charged into one of the end openings along with solvent. The charged vessel is affixed to a bracket attached to a motor driven eccentric which provides vertical vibrational agitation. The tubular Hoke vessel is clamped in a horizontal position in order that the maximum agitation of contents is obtained. This vibrating reaction vessel can be immersed in a hot bath for heating to reaction temperatures and removed, then immersed in a cold bath to quench to room temperature.

Example I

This example illustrates the oxidative and thermal stability of trimethyl borate, a typical boric acid ester according to the present invention.

To a 150-ml. pressure vessel fitted with a thermocouple, rupture disc, and gas inlet tube was charged 19 g. of trimethyl borate and 20 mg. of mercuric acetate. The reactor was sealed, mounted on an agitator assembly and immersed in an oil bath at 200° C. When thermal equilibrium was reached, oxygen was admitted to the reactor up to a total of 200 p.s.i.g. pressure of oxygen. The trimethyl borate was found to be thermally and oxidatively stable over the complete 15 minute reaction period.

Example II

To a pressure vessel as described above was charged 19.6 g. of trimethyl borate, 9 g. of propylene, 10 drops of acetaldehyde and 20 mg. of mercuric acetate. The reactor was sealed, mounted on an agitator assembly and immersed in an oil bath at 180° C. When thermal equilibrium was reached, oxygen was admitted initially at 50 p.s.i.g. over autogenous pressure and gradually increased to 200 p.s.i.g. during a 20 minute reaction period. The thermal pattern showed a maximum temperature rise of 15° C. over bath temperature with the reaction temperature being at least 190° C. (a $\Delta T$ of 10° C. over bath temperature) for three-fourths of the total reaction period. This thermal pattern indicates a substantial production of oxygenated products from propylene. The oxygen feed was shut off and the reactor was immersed in a cold water bath. Chromatographic analyses of the reactor contents showed acetaldehyde, methanol, methyl acetate, acetone, formic acid, acetic acid and water among the oxygenated products and including propylene oxide as the major constituent.

Example III

To a pressure reactor of the above type is charged 25 g. of trimethyl borate, 0.1 g. acetaldehyde initiator and about 7 g. of propylene. The sealed reactor is mounted on an agitator assembly and immersed in an oil bath of 200° C. When thermal equilibrium is reached, oxygen is introduced to a pressure of 200 p.s.i.g. followed after 2 minutes by an additional 100 p.s.i.g. of oxygen. After a reaction period of about 5 minutes, the oxygen is shut off and the reactor is cooled in a cold water bath. Analyses indicate a 30% conversion of propylene to oxygenated products, among which propylene oxide is obtained in highest yield.

Example IV

To a Hoke pressure reactor is charged 28 g. of trimethyl borate, 0.15 g. of acetaldehyde initiator and about 6 g. of ethylene. The sealed reactor is attached to an agitator assembly and lowered into an oil bath at 220° C. When thermal equilibrium is obtained, oxygen is introduced to a total over-pressure of 300 p.s.i.g. over about a 10 minute reaction period. The reaction is quenched as in the above examples. Analyses of the products indicate a 20% conversion of the olefin to oxygenated products including approximately a 28% yield of ethylene oxide.

Example V

To a similar reactor as above is charged 20 g. of trimethyl borate, 0.1 g. of acetaldehyde initiator and about 8 g. of 2-methyl-2-butene. The sealed reactor is mounted on an agitator assembly and lowered into an oil bath at 150° C. After thermal equilibrium is reached, oxygen is introduced gradually up to a total of 300 p.s.i.g. over a reaction interval of about 10 minutes. The reaction is quenched as above and analyses of the products indicate a 42% conversion and about 52% yield of 2-methyl-2,3-epoxybutane.

Example VI

To a similar reactor as above is charged trimethyl borate as solvent, acetaldehyde as initiator and styrene. The sealed reactor is mounted on an agitator assembly and lowered into an oil bath at 150° C. When thermal equilibrium is reached within the reactor, oxygen is added over about a 10 minute reaction time to a total pressure of 250 p.s.i.g. of oxygen. The reaction is then quenched as above to obtain a 51% conversion of olefin to oxygenated porducts among which styrene oxide is a major constituent.

Example VII

A pressure reactor of a type similar to the above is charged with trimethyl borate solvent, acetaldehyde initiator, and butadiene substrate. The sealed reactor is attached to an agitator assembly and immersed in an oil bath at 155° C. After thermal equilibrium is obtained within the reactor, oxygen is introduced to a total pressure of 300 p.s.i.g. over approximately an 8 minute reaction period. The oxygen addition is stopped and the reactor is cooled in a water bath. Analyses indicate a 60% conversion of substrate to oxygenated products containing butadiene monoxide as a major component.

Example VIII

This example illustrates a continuous operation according to the present invention.

A 1-liter stirred stainless steel reactor is employed, fitted with 3 feed lines to introduce propylene, oxygen, and solvent into a bottom inlet in the reactor. A product overflow pipe drains gaseous and liquid product continuously into a separation system.

Using trimethyl borate as solvent, the reactor is heated to 200° C. and propylene is chraged to about 20% by weight of the solvent. The reaction is initiated by incremental additions of oxygen, then the three reactants are metered into the reactor as the oxidation products are removed continuously. In a typical run, the reactants are added at approximately the following hourly rates: propylene, 500 g., oxygen, 150 g., trimethyl borate 3800 g. At a steady reaction state, with a residence time of about 5 minutes, the propylene conversion is 39%, oxygen conversion is over 97%, and propylene oxide yield is over 45%.

Example IX

To a pressure vessel as described above is charged 19 g. of dimethyl ethyl borate, about 9 g. of propylene, 10 drops of acetaldehyde and 20 mg. of mercuric acetate. The reactor is sealed, mounted on an agitator assembly and immersed in an oil bath at 180° C. When thermal equilibrium is reached, oxygen is admitted initially at 50 p.s.i.g. over autogenous pressure and gradually increased to 200 p.s.i.g. during about a 20 minute reaction period. The thermal pattern shows a maximum temperature rise of 10° C. over bath temperature with the reaction temperature being at least 190° C. (a $\Delta T$ of 10° over bath temperature) for three-fourths of the total reaction period. This thermal pattern indicates a substantial production of oxygenated products from propylene. The oxygen feed is shut off and the reactor immersed in a cold water bath. Chromatographic analyses of the reactor contents showed acetaldehyde, methanol, methyl acetate, acetone, formic acid, acetic acid and water among the oxygenated products and propylene oxide as the major constituent.

*Example X*

To a pressure reactor of the above type is charged 25 g. of methyl di-2,2,2-trichloroethyl borate, acetaldehyde initiator and about 7 g. of propylene. The sealed reactor is mounted on an agitator assembly and immersed in an oil bath of 200° C. When thermal equilibrium is reached, oxygen is introduced to a pressure of 200 p.s.i.g. followed after 2 minutes by an additional 100 p.s.i.g. of oxygen. After a reaction period of about 5 minutes, the oxygen is shut off and the reactor is cooled in a cold water bath. Analyses indicate a 30% conversion of propylene to oxygenated products, among which propylene oxide is obtained in highest yield.

*Example XI*

To a Hoke pressure reactor similar to the above type is charged 28 g. of methyl bis(1,1,3-trimethyl-3-bromobutyl) borate, 0.15 g. of acetaldehyde initiator and about 6 g. of ethylene. The sealed reactor is attached to an agitator assembly and lowered into an oil bath at 220° C. When thermal equilibrium is obtained, oxygen is introduced to a total overpressure of 300 p.s.i.g. over approximately a 10 minute reaction period. The reaction is quenched as in the above examples. Analyses of the products indicate a 20% conversion of olefin to oxygenated products including about a 28% yield of ethylene oxide.

*Example XII*

To a similar reactor as above is charged dimethyltrichloroethyl ethylene borate as solvent, acetaldehyde as initiator and styrene. The sealed reactor is mounted on an agitator assembly and lowered into an oil bath at 150° C. When thermal equilibrium is reached within the reactor, oxygen is added over about a 10 minute reaction time to a total pressure of 250 p.s.i.g. of oxygen. The reaction is quenched as above to obtain a 51% conversion of olefin to oxygenated products among which styrene oxide is a major constituent.

*Example XIII*

A pressure reactor of a type similar to the above is charged with t-butyl propylene borate solvent, acetaldehyde initiator, and butadience substrate. The sealed reactor is attached to an agitator assembly and immersed in an oil bath at 155° C. After thermal equilibrium is attained within the reactor, oxygen is introduced to a total pressure of 300 p.s.i.g. over about an 8 minute reaction period. The oxygen addition is stopped and the reactor is cooled in a water bath. Analyses indicate a 60% conversion of substrate to oxygenated products containing butadiene monoxide as a major component.

*Example XIV*

To a similar reactor as above is charged 20 g. of methyl ethylene borate, 0.1 g. of acetaldehyde initiator and about 8 g. of 2-methyl-2-butene. The sealed reactor is mounted on an agitator assembly and lowered into an oil bath at 150° C. After thermal equilibrium is reached, oxygen is introduced gradually up to a total of 300 p.s.i.g. over a reaction interval of about 10 minutes. The reaction is quenched as above and analyses of the product indicate a 42% conversion and about 52% yield of 2-methyl-2,3-epoxybutane.

Various other modifications of the instant invention will be apparent to those skilled in the art without departing from the spirit and scope thereof.

I claim:

1. Process for the preparation of olefin oxides which comprises oxidizing an epoxidizable olefinically unsaturated hydrocarbon compound having up to 18 carbon atoms with molecular oxygen at a temperature within the range of from 80° C. to 350° C. and pressures within the range of from 0.5 to 350 atmospheres in a liquid reaction medium consisting essentially of an ester selected from the group consisting of boric acid esters having the formulae:

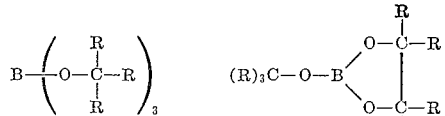

and

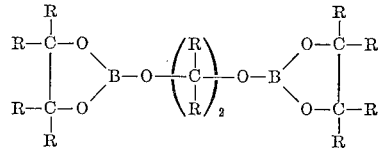

and mixtures thereof, wherein R is selected from the group consisting of hydrogen, straight chain alkyl and haloalkyl groups having from 1 to 3 carbon atoms, and straight chain alkyl and haloalkyl groups containing from 1 to 3 carbon atoms having as substituents on other than the terminal carbon atom thereof a member selected from the group consisting of alkyl and haloalkyl groups having 1 to 3 carbon atoms, provided that the carbon atoms attached to the oxygen atoms in the above formulae have not more than one methylene group attached thereto.

2. Process according to claim 1 wherein the oxidation occurs in the absence of added catalysts.

3. Process for the preparation of propylene oxide which comprises oxidizing propylene with molecular oxygen at a temperature within the range of from 130° C. to 150° C. and a pressure within the range of from 6 to 150 atmospheres in a liquid reaction medium consisting essentially of an ester selected from the group consisting of boric acid esters having the formulae:

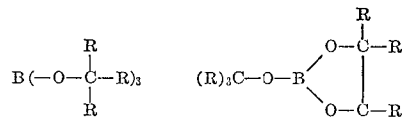

and

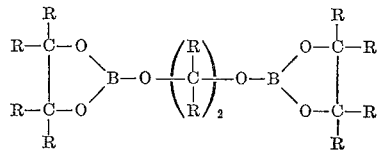

and mixtures thereof, wherein R is selected from the group consisting of hydrogen, straight chain alkyl and haloalkyl groups having from 1 to 3 carbon atoms, and straight chain alkyl and haloalkyl groups containing from 1 to 3 carbon atoms having as substituents on other than the terminal carbon atom thereof a member selected from the group consisting of alkyl and haloalkyl groups having from 1 to 3 carbon atoms, provided that the carbon atoms attached to the oxygen atoms in the above formulae have not more than one methylene group attached thereto.

4. Process according to claim 3 wherein said reaction medium is trimethyl borate.

5. Process according to claim 3 wherein said reaction medium is methyl ethylene borate.

6. Process according to claim 3 wherein said reaction medium is dimethyl ethyl borate.

7. Process according to claim 3 wherein said reaction medium is tertiarybutyl propylene borate.

8. Process according to claim 3 wherein said reaction medium is a mixture of borates.

9. Process according to claim 8 wherein said reaction medium is a mixture of trimethyl borate and methyl ethylene borate.

References Cited by the Examiner

UNITED STATES PATENTS

| 2,366,725 | 1/45 | Gardner | 260—348.5 |
| 2,475,605 | 7/49 | Prutton et al. | 260—348.5 |
| 2,784,202 | 3/57 | Gardner et al. | 260—348.5 |
| 2,895,668 | 5/61 | Shingu | 260—348.5 |

OTHER REFERENCES

Bergmann: "The Chemistry of Acetylene and Related Compounds," page 80, Interscience Publishers Inc., New York (1948).

WALTER A. MODANCE, *Primary Examiner.*

NICHOLAS RIZZO, *Examiner.*

UNITED STATES PATENT OFFICE
CERTIFICATE OF CORRECTION

Patent No. 3,210,381                                           October 5, 1965

Virgil W. Gash

It is hereby certified that error appears in the above numbered patent requiring correction and that the said Letters Patent should read as corrected below.

Column 3, line 31, for "straight chain alkyl groups" read -- straight chain alkyl and haloalkyl groups --; line 33, for "substitutes" read -- substituents --; line 42, for "dentical" read -- identical --; line 72, for "straight alkyl group" read -- straight chain alkyl group --; column 7, line 71, for "accelorators" read -- accelerators --; line 72, for "of promoters" read -- or promoters" column 10, line 26, for "porducts" read -- products --.

Signed and sealed this 1st day of August 1967.

(SEAL)
Attest:

EDWARD M. FLETCHER, JR.
Attesting Officer
                                                         EDWARD J. BRENNER
                                                Commissioner of Patents